3,071,516
16α-HYDROXYLATION OF STEROIDS BY STAUROPHOMA SPECIES

Chester E. Holmlund and Robert H. Blank, Pearl River, N.Y., and Ralph H. Evans, River Vale, N.J., assignors to American Cyanamid Company, New York, N.Y., a corporation of Maine
No Drawing. Filed Aug. 15, 1961, Ser. No. 131,480
9 Claims. (Cl. 195—51)

This invention relates to a microbiological process for the preparation of hydroxylated steroids. More particularly, it relates to a microbiological process for the 16α-hydroxylation of steroids.

Many microorganisms in the past have been described as useful in the hydroxylation of steroids, particularly in the 11α-position. However, the 16α-hydroxylation of steroids by microbiological means has been disclosed in only three instances. For example, species of Streptomyces such as *Streptomyces roseochromogenus*, also, *Didymella vodakii* and *Pestalotia funerea* have been described for 16α-hydroxylation of steroids.

We have now found that species of the genus Staurophoma will 16α-hydroxylate many steroids. Steroids such as Staurophoma species (Lederle Z–912) have been found particularly useful for this purpose.

In general, it has been found that steroids unsubstituted in the 16-position, especially 3-keto or 3-hydroxy steroids of the androstane or pregnane series, can be converted into useful 16α-hydroxy derivatives by subjecting them to the action of enzymes of microorganisms of the genus Staurophoma.

Among the steroids which may be oxidized by the process of this invention are those steroids unsubstituted in the 16-position such as, for example, progesterone, pregnenolone, pregnanolone, corticosterone, 11-desoxycorticosterone 17α-hydroxy-11-desoxycorticosterone, hydrocortisone and esters thereof, particularly the lower fatty acid esters. The process of this invention is also useful in 16α-hydroxylating androstenedione, testosterone and the like.

The process of the present invention is carried out under aerobic conditions in the presence of a suitable nutrient medium at temperatures ranging from 15° C. to 40° C. in the presence of a species of the genus Staurophoma such as Staurophoma species (Lederle Z–912). The reaction to prepare a substantial amount of the 16α-hydroxy steroid is usually complete within a period of a few hours to seven days or longer depending somewhat on the steroid and other conditions. During the growth of the organism under favorable conditions in the presence of a steroid unsubstituted at C–16, hydroxylation takes place in the 16α-position of steroid ring D. The exact mechanism of this 16α-hydroxylation is not known, however, it is believed to be an enzymatic reaction.

The Staurophoma species ATCC No. 14,288 (Lederle Z–912) was grown on potato-dextrose, malt extract and corn meal agars at room temperature (25° C.) and during a period of four weeks the following observations were made.

Cultures on potato-dextrose agar (PDA) spreading broadly, cover the entire Petri plate in 10 days at 25° C. Aerial mycelium dark olive-brown; reverse dark brown to black. Colonies forming sectors readily in age. Aerial hyphae becoming entangled and conspicuously funiculose. Pycnidia, which form after two weeks and continue to increase in number up to about a month, are more or less globoid, without beaks, and embedded in a dark subicle in concentric zones. The surfaces of the pycnidia are covered with cruciately branched hairs. The pycnidiospores are hyaline, elliptical to ovate, $1.8$–$2.0\mu$ x $3.0$–$5.0\mu$.

Cultures on malt-extract agar spread rapidly, covering the entire Petri plate in 10 days. Dense dark gray-brown aerial growth transected by numerous whitish sectors. Funiculose character of aerial mycelium is pronounced. Colony reverse is in dark orange shades. Pycnidia are numerous after two weeks, forming dark concentric circles beneath the aerial mycelial mat. Pycnidia and pycnidiospores are like those on PDA agar.

Cultures on corn meal agar are thin, mostly colorless, spreading over the entire plate in 10 days. Aerial growth is very sparse, becoming light brownish in central zones. Colonies form sectors conspicuously and give rise to areas of somewhat denser growth. Reverse is colorless. No pycnidia are produced.

The system of Clements and Shear (The Genera of Fungi) by H. W. Wilson Company, New York, 1931, was used in determining that the organism is a species of the genus Staurophoma.

A suitable nutrient medium contains a soluble source of carbon, nitrogen and mineral elements. The most useful sources of carbon include sugars such as glucose, sucrose, maltose, dextrose, xylose, galactose and so forth; alcohols such as glycerol or mannitol; organic acids such as citric acid, maleic acid, acetic acid and various other natural products containing carbohydrates such as corn starch, corn steep liquor, soya bean meal, cotton seed meal and many available materials which have been described heretofore as a source of carbon in steroid fermentation processes. Usually a variety of carbon sources can be employed in the medium with good results. Suitable sources of nitrogen include a number of the above named materials such as corn steep liquor, soya bean meal, cotton seed meal and various other substances such as beef extract, casein, yeast, enzymatically digested proteins, degradation products including peptones, amino acids and many other available porteinaceous materials which have been found to be suitable in supporting the growth of fungi. Inorganic sources of nitrogen include urea, ammonium salts, nitrates which may also be used in the medium as a source of nitrogen to provide a favorable growth medium for the organism.

The mineral requirements of fermentation are usually supplied in the crude materials which are often used as sources of carbon and nitrogen or water that is used in the process. However, it may be advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, cobalt, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ½ to 2 volumes of air per volume of medium per minute. Agitation in the bottles or fermenter tanks is provided by mechanical impeller. While the organism will grow at temperatures within the range of 5° C. to 45° C., it is preferable to carry out the process of the present invention at a temperature within the range of 15° C. to 40° C.

To prepare inocula, 4 ml. of washed spore and cell suspension of the organism such as Staurophoma species (Lederle Z–912) is used to inoculate 100 ml. of sterile medium (E2G) described in Example I in a 500 ml. flask. The medium is sterilized by autoclaving for fifteen minutes at fifteen pounds steam pressure (at about 120° C.). The inoculated flask is incubated at about 28° C. on a shaker for about 24 to 72 hours. Such inocula may be used to inoculate larger batches of sterile medium in bottles, and such bottle cultures, after fermentation, may be used to inoculate large batches of medium in fermenter tanks. Other media can be used in place of that described above as shown in the examples hereinafter.

After the growth of the microorganism has taken place to some extent the steroids are added to the fermentation in solution or finely divided form. One of the preferred methods is to dissolve the steroid in methanol or other water-miscible solvents and add it to the fermentation medium at the desired stage in the process. Although the steroid may precipitate from solution when so added, it is dispersed through the medium as a fine suspension and becomes readily available to the organism for oxidation. The amount of steroid added to the fermentation medium may vary considerably but is generally about ⅒ to 1 gram per liter of medium.

During the fermentation process, it is often desirable to add anti-foaming agents such as silicones and glyceride oils. These compounds are added from time to time and in the amounts needed. The fermentation is allowed to proceed for a period of time long enough to achieve maximum conversion of the steroid to the 16α-hydroxy product.

When maximum conversion to the 16α-hydroxy product is attained, the desired 16α-hydroxylated steroid is recovered from the fermentation medium by the following procedure. This general procedure is operative for fermentations of various sizes. In large scale fermentation the crude product or products may be recovered from the fermentation beer by simple solvent extraction using a water-immiscible solvent such as chlorinated lower hydrocarbons, alcohols, esters and ketones. Further purification and separation of the 16α-hydroxylated steroid from the extracts may be accomplished by methods well known to those skilled in the art. The separation and purification of some steroid mixtures often require the use of chromatography.

The 16α-hydroxylated steroids of the androstane series possess androgenic properties, and also may be used as intermediates for the preparation of other active steroids. 16α-hydroxyprogesterone is further useful as a starting material in the preparation of the known steroids: allopregnane-3,16,20-trione and pregnane - 3,16,20 - trione. The usefulness of 16α-hydroxylation of 9α-halogenated steroids for purposes of abolishing salt-retaining properties is well-known.

The preparation of the 16α-hydroxylated steroids of the present invention are described in greater detail in the following specific examples.

*Example I*

A 4.0 ml. washed spore and cell suspension of Staurophoma sp. ATCC No. 14288 is added aseptically to a 500 ml. Erlenmeyer flask containing 100 ml. of sterilized medium (E2G) of the following composition: Edamin, 20 grams; glucose, 20 grams; corn steep liquor, 5.0 grams and water, 1.0 liter; the pH of the medium is adjusted to pH 7.0±1 prior to autoclaving. The inoculated flask is shaken on a reciprocating type shaker for 48 hours at 28° C. At this time, 5 ml. of the fermentation mash is used to inoculate another 500 ml. Erlenmeyer flask containing 100 ml. of the above described medium. After a 24 hour incubation period on a reciprocating shaker at 28° C. twenty mg. of 4-androstene-3,17-dione, dissolved in 2 ml. of methanol is added to the fermentation vessel. After a further incubation under the same conditions for 48 hours an aliquot of the mash is removed and extracted with one three volume portion of ethyl acetate. The solvent extract is taken to dryness under reduced pressure and the residue dissolved in a minimal quantity of methanol. An aliquot of this solution is spotted on a paper chromatogram and developed with an appropriate solvent system. The developed papergram, after drying, is examined for ultraviolet absorbing spots. A substantial quantity of 16α-hydroxyandrostenedione is shown to be present. Identity in this instance is based on comparison of the mobility of the fermentation product with that of a sample of 16α-hydroxyandrostenedione.

*Example II*

A total of 500 mg. of androstenedione is fermented with Staurophoma sp. (Lederle Z–912) under the conditions of Example I. In this instance, each of twenty-five 500 ml. Erlenmeyer flasks containing 100 ml. of medium (E2G) receives 20 mg. of the steroid. After a 53 hour fermentation period the contents of the flasks are pooled and filtered. The pad and filtrate are extracted separately with ethyl acetate. An aliquot of the solvent extract of the filtrate is taken to dryness under reduced pressure and the residue subjected to partition chromatography on diatomaceous earth, employing the solvent system water:methanol:dioxane:cyclohexane in the volume ratio of 1:1:3:5. The major fermentation product emerges at about 3.7 holdback volumes. Assay of the quantity of product present in this fraction by ultraviolet spectrophotometry indicates a 35.8% conversion to product. The remainder of the solvent extract from the fermentation filtrate is concentrated to a dry residue under reduced pressure which is chromatographed on a larger partition column with the same solvent system described above. The fraction emerging at about 5.5 holdback volumes is concentrated to a residue which is then recrystallized from acetone-hexane yielding analytically pure 16α-hydroxyandrostenedione, melting point 180–183° C.

*Example III*

Employing conditions similar to those of Example I, the steroids testosterone, progesterone and androstenedione are individually fermented with Staurophoma sp. (ATCC No. 14288). After a 48 hour fermentation period, aliquots are removed from the flasks extracted with ethyl acetate and the extracts examined by paper chromatography. In each instance, the 16α-hydroxylated products are observed. The major product arising from the testosterone fermentation, however, is 16α-hydroxyandrostenedione. The latter result shows the presence of 17-hydroxysteroid dehydrogenase activity in the culture of Staurophoma sp. (ATCC No. 14288).

We claim:

1. A method of converting a steroid into a 16α-hydroxy derivative thereof which comprises subjecting a steroid selected from the group consisting of a steroid of the 4-pregnene-3,20-dione series and a steroid of the 3,17-dioxygenated androstane series to the action of enzymes of Staurophoma species (ATCC No. 14288) under oxidizing conditions and recovering the 16α-hydroxy steroid therefrom.

2. The method of claim 1 wherein the steroid is of the 4-pregnene-3,20-dione series.

3. The method of claim 1 wherein the steroid is of the 3,17-dioxygenated androstane series.

4. The method of claim 1 wherein the steroid is progesterone.

5. The method of claim 1 wherein the steroid is androstenedione.

6. The method of claim 1 wherein the steroid is testosterone and the product recovered after fermentation is 16α-hydroxy androstenedione.

7. A method of preparing 16α-hydroxyandrostenedione which comprises subjecting 4-androstene-3,17-dione to the enzymatic action of Staurophoma species (ATCC No. 14288) in a media supporting growth of said microorganism and recovering said compound therefrom.

8. A method of preparing 16α-hydroxy progesterone which comprises subjecting progesterone to the enzymatic action of Staurophoma species (ATCC No. 14288) in a media supporting growth of said microorganism and recovering said compound therefrom.

9. A method of preparing 16α-hydroxyandrostenedione which comprises subjecting testosterone to the enzymatic action of Staurophoma species (ATCC No. 14288) in a media supporting growth of said microorganism and recovering said compound therefrom.

References Cited in the file of this patent

UNITED STATES PATENTS

| | | |
|---|---|---|
| 2,872,381 | Fried et al. | Feb. 3, 1959 |
| 3,007,950 | Fonken et al. | Nov. 7, 1961 |